(12) United States Patent
Mori

(10) Patent No.: US 8,451,349 B2
(45) Date of Patent: May 28, 2013

(54) ELECTRONIC CAMERA VIDEO SIGNAL CORRECTING DEVICE

(75) Inventor: Yoshizo Mori, Odawara (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/067,509

(22) Filed: Jun. 6, 2011

(65) Prior Publication Data

US 2011/0261226 A1 Oct. 27, 2011

Related U.S. Application Data

(63) Continuation of application No. 11/315,219, filed as application No. PCT/JP2004/009570 on Jun. 30, 2004, now abandoned.

(30) Foreign Application Priority Data

Jul. 1, 2003 (JP) .................................. 2003-189509

(51) Int. Cl.
*H04N 5/217* (2006.01)
*H04N 9/65* (2006.01)

(52) U.S. Cl.
USPC .......................................... 348/241; 348/642

(58) Field of Classification Search
USPC .................. 348/241, 243, 246, 247, 244, 642
See application file for complete search history.

(56) References Cited

U.S. PATENT DOCUMENTS

| 5,625,413 | A | 4/1997 | Katoh et al. |
| 5,729,288 | A | 3/1998 | Saito | |
| 6,005,615 | A | 12/1999 | Tsuda | |
| 2002/0015111 | A1* | 2/2002 | Harada | 348/642 |
| 2003/0128285 | A1* | 7/2003 | Itoh | 348/246 |
| 2003/0133027 | A1 | 7/2003 | Itoh | |
| 2003/0160772 | A1 | 8/2003 | Kunimi et al. | |

FOREIGN PATENT DOCUMENTS

| JP | A-03-234183 | 10/1991 |
| JP | A-04-3669 | 1/1992 |
| JP | A-8-51571 | 2/1996 |

(Continued)

OTHER PUBLICATIONS

Oct. 19, 2004 International Search Report issued in International Application No. PCT/JP2004/009570.
Oct. 28, 2008 Office Action issued in U.S. Appl. No. 11/315,219.

(Continued)

*Primary Examiner* — Roberto Velez
*Assistant Examiner* — Joel Fosselman
(74) *Attorney, Agent, or Firm* — Oliff & Berridge, PLC

(57) ABSTRACT

A device stores in ROM white spot addresses, white spot levels, an OB level median, sensitivity, and time-in-second under dark shooting, a temperature coefficient correcting the white spot level according to the temperature under normal shooting, a sensitivity coefficient for the sensitivity-based correction, and a time-in-second coefficient for the exposure time-in-second-based correction. A temperature difference during shooting a subject is obtained according to the difference between OB level median during normal shooting and that during dark shooting. A correction value for the white spot level due to temperature is obtained from temperature difference and temperature coefficient, and similarly, correction value due to sensitivity is obtained from sensitivity difference and sensitivity coefficient, and correction value due to time-in-second is obtained from time-in-second difference and time-in-second coefficient for correction. Dark current is corrected by subtracting OB level median during shooting a subject from the video signal during shooting a subject.

6 Claims, 4 Drawing Sheets

FOREIGN PATENT DOCUMENTS

| | | |
|---|---|---|
| JP | A-9-23358 | 1/1997 |
| JP | A-10-271398 | 10/1998 |
| JP | A-11-136580 | 5/1999 |
| JP | A-2000-101925 | 4/2000 |
| JP | A-2000-224487 | 8/2000 |
| JP | A-2000-316074 | 11/2000 |
| JP | A-2000-350091 | 12/2000 |
| JP | A-2001-94882 | 4/2001 |
| JP | A-2002-77697 | 3/2002 |
| JP | A-2002-94884 | 3/2002 |
| JP | A-2003-46871 | 2/2003 |

OTHER PUBLICATIONS

Feb. 13, 2009 Supplementary European Search Report issued in European Patent Application No. 04 74 7039.
Meynants et al., "A Circuit for the Correction of Pixel Defects in Image Sensors." XP000884997. pp. 312-315. Jan. 1, 1998.
Jul. 21, 2009 Office Action issued in U.S. Appl. No. 11/315,219.
Feb. 2, 2010 Office Action issued in Japanese Patent Application No. 2005-511378 (with English-Language Translation).
May 27, 2010 Office Action issued in U.S. Appl. No. 11/315,219.
Dec. 6, 2010 Office Action issued in U.S. Appl. No. 11/315,219.

* cited by examiner

F I G. 2
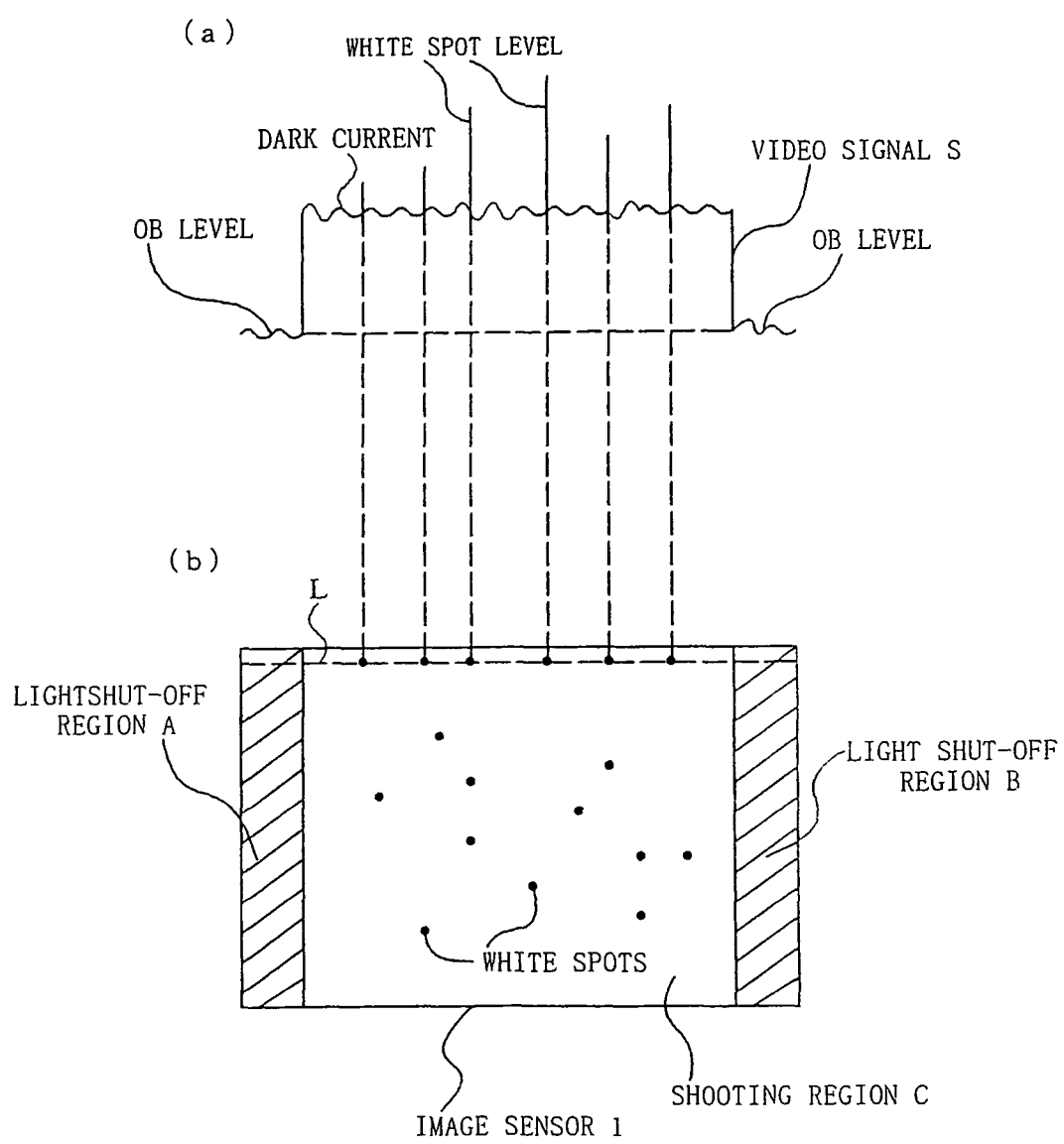

F I G. 3
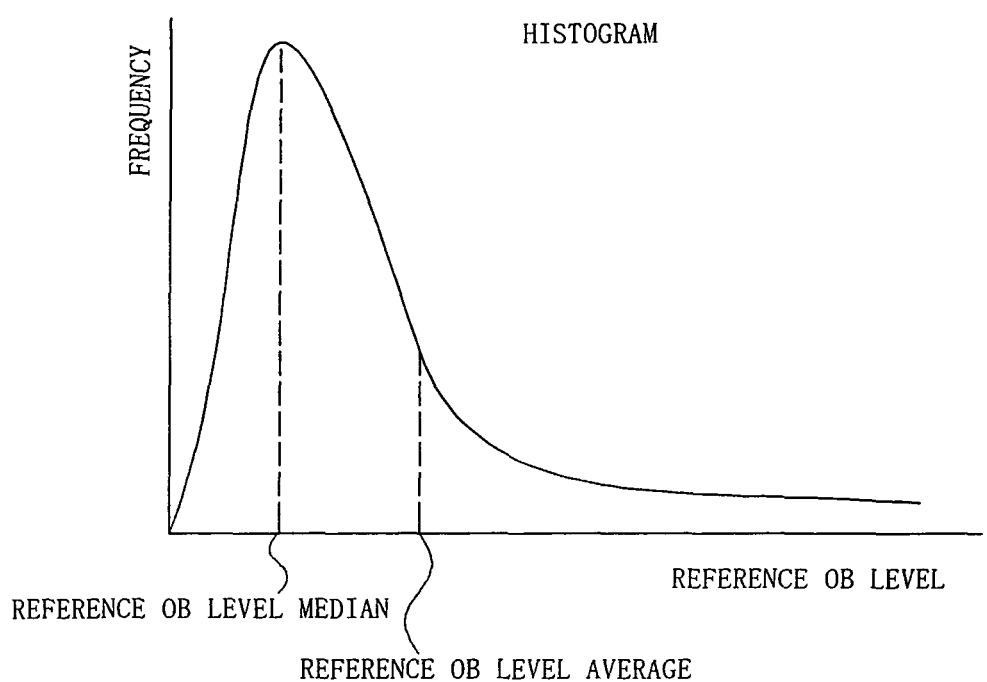

ELECTRONIC CAMERA VIDEO SIGNAL CORRECTING DEVICE

CROSS REFERENCE TO RELATED APPLICATION

This is a Continuation of application Ser. No. 11/315,219 filed Jun. 30, 2004, which in turn is a Continuation of PCT International Patent Application No. PCT/JP2004/009570 filed Jun. 30, 2004. The disclosure of the prior applications is hereby incorporated by reference herein in its entirety.

BACKGROUND OF THE INVENTION

1. Field of the Invention

The present invention relates to a video signal correcting device of an electronic camera suitable for correcting a dark current and a dark-time white spot included in a video signal of an electronic camera.

2. Description of the Related Art

Generally, performing long time-in-second shooting with an electronic camera causes a situation in which a subject cannot be shot correctly due to the influence of dark currents and dark-time white spots. In other words, a video signal output from an image sensor of an electronic camera generally contains dark currents and dark-time white spots. As a result, it is not possible to correctly shoot a subject.

Here, a dark-time white spot is a white spot appearing in a video signal output from an image sensor when there is a defect (contamination of impurities etc.) in a photodiode constituting the image sensor. Due to the defect, charges are generated, even though no light is irradiated thereto. The dark-time white spot occurs in parts of many photodiodes constituting the image sensor.

A dark current level and a white spot level of the dark-time white spot (magnitude of a signal) change according to the shooting temperature and the shooting time-in-second (exposure time). In other words, the higher the temperature is and the longer the exposure time is, the greater the levels become.

Further, the higher the temperature is and the longer the shooting time-in-second is, the larger the number of dark-time white spots gets. This is because the higher the temperature is and the longer the shooting time-in-second is, the larger the number of charges generated by the defect of the photodiode gets. As a result, the charges generated by the defect of the photodiode easily exceed the threshold value recognized as a dark-time white spot in the video signal.

Moreover, the dark current level and the white spot level of dark-time white spot also change depending on a shooting sensitivity. Here, the sensitivity depends on the system of the electronic camera (gain in amplifying a video signal). In other words, the higher the sensitivity is, the greater the dark current level and the white spot level of dark-time white spot become. Furthermore, the higher the sensitivity is, the larger the number of dark-time white spots gets. This is because the higher the sensitivity is, more easily the levels exceed the threshold value recognized as a dark-time white spot in the video signal of an electronic camera.

In the prior art, shooting is performed as follows to remove the influences of the dark current and the dark-time white spot.

That is, after normal shooting is performed, dark shooting is performed for the same length of time-in-second as that of the normal shooting. Then, the video signal obtained by the dark shooting is subtracted from the video signal obtained by the normal shooting to obtain a video signal from which the influence of the dark current and the dark-time white spot has been removed.

Incidentally, as a prior art relating to prevention of the dark current, there is one that reduces the amount of heat generated by an electronic camera to prevent the dark current (refer to Japanese Unexamined Patent Application Publication No. Hei 10-271398).

The above-mentioned prior art has the following problems.

Firstly, since dark shooting is performed after normal shooting of a subject is performed for the same length of time-in-second, it takes double the time of the normal shooting to complete shooting. In particular, when shooting of a celestial photograph etc., for example, requires 10-minute dark shooting after 10-minute normal shooting, and therefore it takes a long time (20 minutes or longer) until the shooting result can be visually recognized on a liquid crystal monitor.

Secondly, shooting twice doubles the power consumption.

SUMMARY OF THE INVENTION

It is an object of the present invention to provide a video signal correcting device of an electronic camera that is capable of obtaining without shooting twice a video signal free from the influence of a dark current and a dark-time white spot by performing dark current correction and dark-time white spot correction.

An aspect of the first invention includes a storage unit that stores therein a white spot address, a white spot level, and a optical black level median obtained from a video signal at the time of dark shooting, the sensitivity and the time-in-second at the time of dark shooting, as well as a temperature coefficient for correcting the white spot level in accordance with the temperature at the time of shooting by an electronic camera, a sensitivity coefficient for correcting the white spot level in accordance with the sensitivity at the time of shooting by the electronic camera, and a time-in-second coefficient for correcting the white spot level in accordance with the exposure time-in-second at the time of shooting by the electronic camera, and also includes a temperature detection unit which obtains a temperature difference at the time of shooting a subject according to a difference between the optical black level median at the time of shooting a subject and the optical black level median at the time of dark shooting stored in the storage unit. It also includes an operation unit which obtains a correction value for the white spot level due to a temperature according to the temperature difference and the temperature coefficient stored in the storage unit, obtains a correction value for the white spot level due to a sensitivity according to a difference between the sensitivity at the time of shooting a subject and the sensitivity at the time of dark shooting stored in the storage unit and to the sensitivity coefficient stored in the storage unit, obtains a correction value for the white spot level due to a time-in-second according to a difference between the time-in-second at the time of shooting a subject and the time-in-second at the time of dark shooting stored in the storage unit and to the time-in-second coefficient stored in the storage unit, performs correction on the white spot level included in the video signal at the time of shooting a subject according to each correction value for the white spot level due to the temperature, the sensitivity, and the time-in-second, and subtracts the optical black level median at the time of shooting a subject from.

An aspect of the second invention includes the video signal correcting device of an electronic camera according to the first invention, wherein the optical black level median is an optical black level average.

An aspect of the third invention includes a storage unit which stores therein a white spot address, a white spot level, and a reference dark current level median obtained from a video signal at the time of dark shooting, the temperature, the sensitivity, and the time-in-second at the time of dark shooting, as well as a temperature coefficient for correcting the white spot level and a dark current level median in accordance with the temperature at the time of shooting by an electronic camera, a sensitivity coefficient for correcting the white spot level and the dark current level median in accordance with the sensitivity of the electronic camera, and a time-in-second coefficient for correcting the white spot level and the dark current level median in accordance with the exposure time-in-second of the electronic camera, and also includes a temperature detection unit which detects a temperature at the time of shooting. It also includes an operation unit which obtains a correction value for the white spot level due to a temperature and a correction value for the dark current level median due to a temperature according to a difference between the temperature at the time of shooting a subject detected by the temperature detection unit and the temperature at the time of dark shooting stored in the storage unit and to the temperature coefficient stored in the storage unit, obtains a correction value for the white spot level due to a sensitivity and a correction value for the dark current level median due to a sensitivity according to a difference between the sensitivity at the time of shooting a subject and the sensitivity at the time of dark shooting stored in the storage unit and to the sensitivity coefficient stored in the storage unit, obtains a correction value for the white spot level due to a time-in-second and a correction value for the dark current level median due to a time-in-second according to a difference between the time-in-second at the time of shooting a subject and the time-in-second at the time of dark shooting stored in the storage unit and to the time-in-second coefficient stored in the storage unit, and performs correction on the white spot level and the dark current level median both included in the video signal at the time of shooting a subject according to each correction value for the white spot level due to the temperature, the sensitivity, and the time-in-second.

An aspect of the fourth invention includes the video signal correcting device of an electronic camera according to the third invention, wherein the dark current level median is a dark current level average.

An aspect of the fifth invention includes the video signal correcting device of an electronic camera according to the third invention, wherein the dark current level median is an optical black level median.

An aspect of the sixth invention includes the video signal correcting device of an electronic camera according to the third invention, wherein the dark current level median is an optical black level average.

According to the aspects of the first to sixth inventions, it becomes possible to correct the dark current and the white spot level according to the temperature, the sensitivity, and the exposure time-in-second by storing plural parameters obtained at the time of dark shooting in the storage unit and using them at the time of shooting a subject.

Further, according to the aspects of the first to sixth inventions, it is possible to provide a video signal correcting device of an electronic camera that is capable of obtaining without shooting twice a video signal free from the influence of the dark current and the dark-time white spot by performing dark current correction and dark-time white spot correction.

BRIEF DESCRIPTION OF THE DRAWINGS

FIGS. 2(a) and 2(b) are diagrams showing an example of a relationship between an image sensor 1 and a video signal S shown in FIG. 1.

FIG. 3 is a diagram showing a histogram (the horizontal axis represents reference OB level and the vertical axis represents frequency) when dark shooting is performed with an electronic camera.

DESCRIPTION OF THE PREFERRED EMBODIMENT

Embodiments of the present invention will be explained below.

First Embodiment

Figure 1:
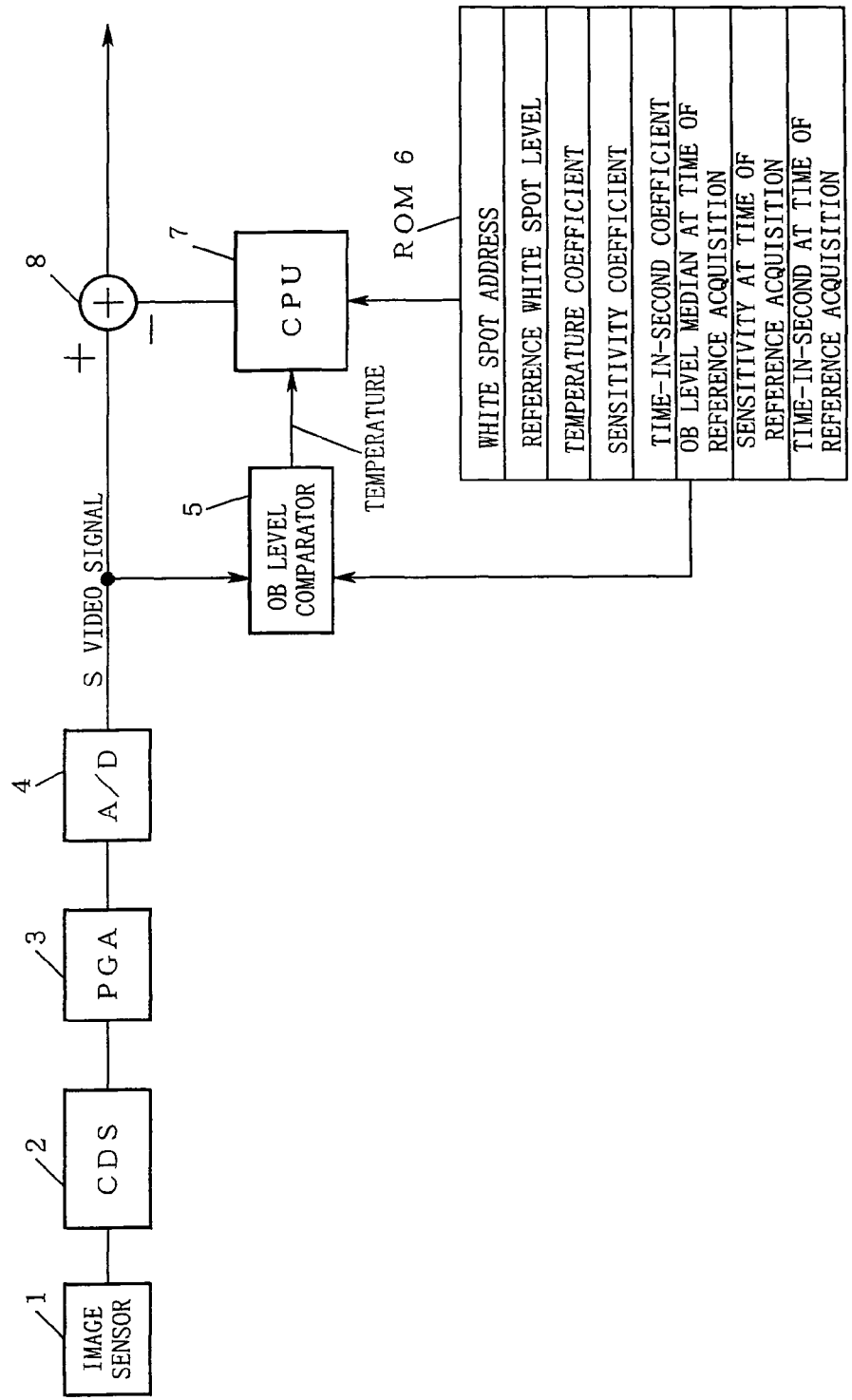
FIG. 1 is a block diagram showing a first embodiment of the present invention.

FIG. 1 is a block diagram showing a first embodiment of the present invention.

In FIG. 1, reference numeral 1 denotes an image sensor composed of, although not shown in the drawing, plural photodiodes, and CCDs in plural lines for transferring charges generated in each photodiode, etc. Reference numeral 2; a correlated double sampling (referred to as CDS in the figure) circuit, reference numeral 3; a programmable gain amplifier (referred to as PGA in the figure), reference numeral 4; an analog-to-digital converter (referred to as A/D in the figure), reference numeral 5; an optical black level comparator (referred to as OB level comparator in the figure), reference numeral 6; a ROM for storing various data, reference numeral 7; a CPU, and reference numeral 8; an adder.

Here, the image sensor 1 shoots a subject and outputs a shooting result as an electric signal. As well known, the correlated double sampling circuit 2 has a role to reduce low frequency noise from the electric signal received from the image sensor 1. The programmable gain amplifier 3 adjusts the output of the electric signal to an appropriate level by adjusting the gain. The analog-to-digital converter 4 converts an electric signal, which is an analog signal, into a digital signal. The OB level comparator circuit 5 compares an OB level at the time of acquisition of the reference stored in the ROM 6 and an OB level included in the video signal S and outputs the difference therebetween. This is used for calculating the temperature at the time of shooting from the difference between both of the OB levels, as will be described later.

The operation of the CPU 7 and the adder 8 is explained below together with the operation in the first embodiment shown in FIG. 1.

The operation in the first embodiment shown in FIG. 1 will be explained.

(1) First, the electronic camera performs dark shooting. At this time, the CPU 7 stores various data in the ROM 6.

In the first embodiment, by dark shooting, each of the data of the white spot address, the reference white spot level, the OB level median at the time of acquisition of the reference, the sensitivity at the time of acquisition of the reference, and the time-in-second (exposure time-in-second) at the time of acquisition of the reference is stored in the ROM 6.

Here, the time of acquisition of the reference means the time of dark shooting. The temperature coefficient, the sensitivity coefficient, and the time-in-second coefficient obtained in advance are also stored. The meaning of each of the data is explained below.

The white spot address means an address showing a dark-time white spot resulting from a defective photodiode in the image sensor 1. It is needless to say that there exist plural white spot addresses.

Additionally, the reference white spot level means an output level of the video signal S at each white spot address. Therefore, the white spot level is stored corresponding to each of the plural white spot addresses.

Next, the OB level median at the time of acquisition of the reference is explained. First, the OB level at the time of acquisition of the reference will be explained. The OB level at the time of acquisition of the reference means an optical black (OB) level at the time of acquisition of the reference white spot level. Specifically, the OB level is an output level of the video signal S to be output from the region in which the photodiode is completely shut-off optically in the image sensor 1. In other words, the image sensor 1 comprises plural photodiodes in a region constructed such that light is completely shut off, and the video signal S output based on the plural photodiodes in the light shut-off region is the OB level.

Using FIGS. 2(*a*) and 2(*b*), the OB level will be explained specifically.

FIGS. 2(*a*) and 2(*b*) are diagrams showing an example of a relationship between the video signal S and a light receiving region of the image sensor 1. FIG. 2 (*a*) is a waveform diagram showing an example of the video signal S output from the A/D converter 4 shown in FIG. 1. FIG. 2 (*b*) is an illustrative diagram showing plural defective photodiodes (shown as white spots in the figure) present in a shooting region C of the image sensor 1 shown in FIG. 1 and light shut-off regions A and B provided for outputting the OB level.

The video signal S shown in FIG. 2 (*a*) is one corresponding to a line L in the light receiving region of the image sensor 1 shown in FIG. 2 (*b*). As shown in FIGS. 2 (*a*) and 2(*b*), the video signal S read out from the light shut-off regions A and B is an output from the region in which the photodiode of the image sensor 1 is optically shut off, therefore, it results in an OB level. In the video signal S in the light shut-off regions A and B, the OB level has a meaning of defining a black level in the video signal S.

The OB level median at the time of acquisition of the reference stored in the ROM 6 indicates a reference OB level at which the frequency becomes maximum when the video signal S output from the light shut-off regions A and B is expressed in a histogram (the horizontal axis represents the reference OB level and the vertical axis represents frequency).

Using FIG. 3, the OB level median at the time of acquisition of the reference will be explained. FIG. 3 is a diagram showing an example of a histogram (the horizontal axis represents the reference OB level and the vertical axis represents frequency) when dark shooting is performed. As shown in the drawing, the reference OB level at which the frequency becomes maximum is the reference OB level median. Further, a reference OB level at which the frequency becomes average is the reference OB level average. Additionally, in this embodiment, the reference OB level median is stored in the ROM 6, however, the reference OB level average may be stored instead of the reference OB level median.

The sensitivity at the time of acquisition of the reference means the sensitivity of the programmable gain amplifier (PGA) 3 at the time of acquisition of the reference white spot level. The sensitivity may be expressed by the ISO sensitivity or the gain of the programmable gain amplifier (PGA) 3.

The time-in-second at the time of acquisition of the reference means an exposure time-in-second at the time of acquisition of the reference white spot level.

Further, the temperature coefficient is one necessary for correcting the white spot level in accordance with the temperature difference between the temperature when the white spot level and the OB level at the time of acquisition of the reference (the temperature at the time of dark shooting) are obtained and the temperature at the time of normal shooting. As described above, the higher the temperature is, the higher the white spot level becomes. Therefore, the white spot level is corrected in accordance with the temperature difference.

Additionally, as described above, the higher the temperature is, the larger the number of white spots gets. This is because when the temperature is high, the number of photodiodes having a defect of exciting a charge exceeding the threshold value of the white spot level increases. Therefore, it is preferable for the temperature when obtaining the OB level at the time of acquisition of the reference and the white spot level (the temperature at the time of dark shooting) to be relatively high (for example, about 25° C.) in order to make it easier to obtain a large number of white spots.

The sensitivity coefficient is one that corrects the level of the video signal S in accordance with the sensitivity of the programmable gain amplifier (PGA) 3 shown in FIG. 1. Since the video signal S contains a dark current and a white spot level, it becomes a coefficient which corrects the dark current and the white spot level as a result. Since the higher the sensitivity of the programmable gain amplifier (PGA) 3 is, the greater and the higher the dark current and the white spot level become, the coefficient is stored for correcting the dark current and the white spot level. This is not caused by the photodiode but by the system of an electronic camera. In other words, when the sensitivity is high, the number of photodiodes having a defect of generating a charge exceeding the threshold value of the white spot level (the number of white spots) increases, and the dark current also increases.

The time-in-second coefficient is one that corrects a dirk current and a white spot level in accordance with an exposure time-in-second. As described above, the longer the exposure time-in-second is, the greater and the higher the dark current and the white spot level become, therefore, the coefficient is stored for correcting the dark current and the white spot level in accordance with the exposure time-in-second.

The temperature coefficient, the sensitivity coefficient, and the time-in-second coefficient can be obtained in advance by the test etc. conducted at the time of design of an electronic camera or of shipping from factory, and the obtained coefficients are stored in the ROM 6.

Additionally, it is preferable to perform dark shooting under the conditions of high temperatures (for example, about 25° C.), long time-in-second shooting, and high sensitivity. This is because it is possible to obtain a large number of dark-time white spots (white spot addresses) under these conditions.

Further, by performing dark shooting at the time of shipping from factory, it is possible to save man-hours required for a user to perform dark shooting and store each of the data in the ROM 6.

(2) Next, the electronic camera storing various data in the ROM 6 by dark shooting performs normal shooting of a subject. Therefore, the video signal S by shooting of the subject is output from the A/D converter 4.

(3) Next, the CPU 7 in FIG. 1 reads out each white spot address and the white spot level corresponding to each white spot address from the ROM 6. Subsequently, the CPU 7 recognizes the sensitivity and the exposure time-in-second at the time of shooting of the subject.

(4) Next, the OB level comparator 5 obtains the OB level from the video signal S based on the shooting of the subject and also obtains the OB level median at the time of acquisition of the reference from the ROM 6. According to this, the OB level comparator 5 compares the OB level median at the time of shooting that is corrected in accordance with the exposure time-in-second (exposure time) (specifically, (OB level median at the time of shooting)×K×(time-in-second at the time of acquisition of the reference/time-in-second at the time of shooting, where K is a predetermined coefficient)) and the OB level median at the time of acquisition of the reference at the time of dark shooting, and obtains the temperature difference between the time of shooting of the subject and the time of dark shooting based on the difference between both of the OB levels.

(5) The CPU 7 calculates the temperature correction value by multiplying the obtained temperature difference and the temperature coefficient stored in the ROM 7.

Further, the CPU 7 obtains the sensitivity difference between the sensitivity at the time of shooting of the subject obtained in advance and the sensitivity at the time of acquisition of the reference stored in the ROM 7, and calculates the sensitivity correction value by multiplying the sensitivity difference and the sensitivity coefficient stored in the ROM 7.

Similarly, the CPU 7 obtains the time-in-second difference between the exposure time-in-second at the time of shooting of the subject obtained in advance and the time-in-second at the time of acquisition of the reference stored in the ROM 7, and calculates the time-in-second correction value by multiplying the sensitivity difference by the time-in-second coefficient stored in the ROM 7.

(6) Next, the CPU 7 performs correction of the white spot level at each white spot address based on the temperature correction value, the sensitivity correction value, and the time-in-second correction value for the video signal S output from the analog-to-digital converter 5 using the adder 8.

At the same time, the CPU 7 obtains the OB level of the video signal S at the time of shooting of the subject by a well-known method, subtracts the OB level at the time of shooting of the subject from the video signal S output from the analog-to-digital converter 5 using the adder 8, and performs dark current correction.

Additionally, in the first embodiment described above, the reference OB level median is stored in the ROM 6, however, the reference OB level average may be stored instead of the reference OB level median as described above. In this case, the OB level comparator 5 compares the OB level average at the time of acquisition of the reference at the time of dark shooting and the OB level at the time of normal shooting of the subject, and obtains the temperature difference at the time of shooting of the subject based on the difference between both of the OB levels.

According to the first embodiment, since it is not necessary to perform shooting twice, the shooting time can be considerably shortened and power consumption can be considerably reduced.

Further, it is not necessary to provide a temperature sensor.

Furthermore, since the correction of the white spot level depending on the temperature, the sensitivity, and the time-in-second is performed by detecting the temperature at the time of shooting of the subject using the OB level of the electronic camera, and at the same time, the correction of the dark current is performed by subtracting the OB level at the time of shooting of the subject from the video signal at the time of shooting of the subject, accurate correction of the dark current can be made possible.

Second Embodiment

Figure 4:
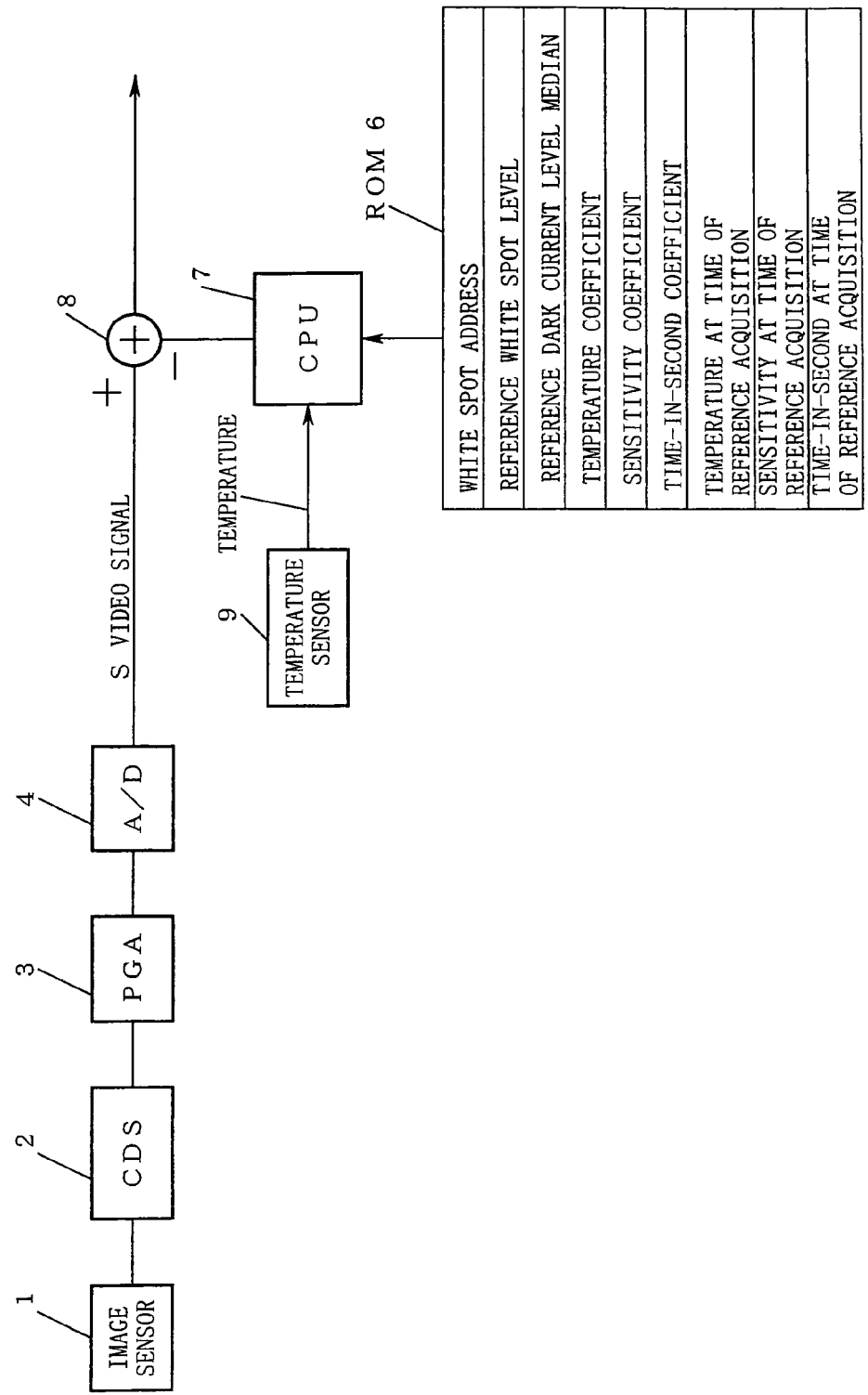
FIG. 4 is a block diagram showing a second embodiment of the present invention.

FIG. 4 is a block diagram showing a second embodiment of the present invention. In the second embodiment shown in FIG. 4, the same parts as those in the first embodiment shown in FIG. 1 are assigned with the same symbols and the explanation thereof will be omitted.

The second embodiment differs from the first embodiment in that a temperature sensor 9 is provided instead of the OB level comparator 5 in the first embodiment, the reference dark current level median and the temperature at the time of acquisition of the reference are stored in the ROM 6, and the OB level median at the time of acquisition of the reference is not stored in the ROM 6.

Additionally, instead of the reference dark current level median, the reference dark current level average may be stored.

The operation in the second embodiment shown in FIG. 4 will be explained below.

(1) First, the electronic camera performs dark shooting and stores various data shown in the drawing in the ROM 6. As described above, the reference dark current level median (or the reference dark current level average) and the temperature at the time of acquisition of the reference are newly stored in the ROM 6.

Here, in a histogram (the horizontal axis represents the dark current level and the vertical axis represents frequency) when dark shooting is performed, the dark current level at which the frequency becomes maximum is the reference dark current level median. Further, the dark current level at which the frequency becomes the average is the reference dark current level average.

The temperature at the time of acquisition of the reference stored in the ROM 6 is used for performing the temperature correction of the white spot level and the dark current based on the difference from the temperature data output from the temperature sensor 9 at the time of shooting of the subject.

Since other data stored in the ROM 6 are the same as those in the first embodiment, the explanation thereof will be omitted.

(2) Next, the electronic camera storing various data in the ROM 6 by dark shooting performs shooting of the subject. Consequently, the video signal S according to the shooting of the subject is output from the A/D converter 4.

(3) In this state, the CPU 7 in FIG. 4 reads out the reference dark current level median, each white spot address, and the white spot level at each white spot address from the ROM 6.

(4) Subsequently, the CPU 7 in FIG. 4 recognizes the sensitivity and the exposure time-in-second at the time of shooting of the subject. The sensitivity and the exposure time-in-second at the time of shooting of the subject themselves are stored in a memory in the CPU 7.

Further, the CPU 7 in FIG. 4 obtains the temperature at the time of shooting of the subject from the temperature sensor 9.

(5) The CPU 7 obtains the temperature difference between the temperature at the time of shooting of the subject and the temperature at the time of acquisition of the reference stored in the ROM 6, the sensitivity difference between the sensitivity at the time of shooting of the subject and the sensitivity at the time of acquisition of the reference, and the time-in-second difference between the exposure time-in-second at the time of shooting of the subject and the time-in-second at the time of acquisition of the reference stored in the ROM 7.

Subsequently, the CPU 7 calculates the correction value for each white spot level and the dark current correction value about the dark current level at the time of acquisition of the reference based on the temperature coefficient, the sensitivity coefficient, and the time-in-second coefficient stored in the ROM 6.

(6) Next, the CPU 7 performs correction of the white spot level based on the white spot address for the video signal S output from the analog-to-digital converter 5 using the adder 8. Further, the CPU 7 performs correction of the dark current using the dark current correction value for the video signal S output from the analog-to-digital converter 5 using the adder 8

Additionally, the second embodiment described above is configured such that the dark current median is corrected as a dark current, however, the present invention is not limited to this, and it may be configured such that the dark current level average, the OB level median, and the OB level average are corrected.

According to the second embodiment, since it is not necessary to perform shooting twice, the shooting time can be considerably reduced and the power consumption can be considerably reduced.

Further, the temperature is detected using the temperature sensor and the correction of the white spot level is performed depending on the temperature, the sensitivity, and the time-in-second in addition to the correction of the dark current, therefore, accurate correction becomes possible.

Additionally, in the second embodiment, the temperature coefficient to be stored in the ROM 6 is obtained in advance, however, since the temperature sensor 9 is provided in the present embodiment, it is also possible to obtain the temperature coefficient from the difference between the temperature at the time of shooting of the subject and the temperature at the time of dark shooting.

The invention is not limited to the above embodiments and various modifications may be made without departing from the spirit and scope of the invention. Any improvement may be made in part or all of the components.

What is claimed is:

1. A video signal correcting device of an electronic camera comprising:
   a storage unit which stores therein white spot addresses, and an optical black level median obtained from a video signal at a time of dark shooting, and a sensitivity and a time-in-second at the time of dark shooting, as well as a temperature coefficient for correcting an output level of the video signal at each of the white spot addresses in accordance with a temperature at a time of shooting by the electronic camera, a sensitivity coefficient for correcting the output level of the video signal at each of the white spot addresses in accordance with the sensitivity at the time of shooting by the electronic camera, and a time-in-second coefficient for correcting the output level of the video signal at each of the white spot addresses in accordance with an exposure time-in-second at the time of shooting by the electronic camera;
   a temperature detection unit which obtains a temperature difference at a time of shooting a subject according to a difference between the optical black level median at the time of shooting a subject and the optical black level median at the time of dark shooting stored in said storage unit; and
   an operation unit which obtains a correction value for the output level of the video signal at each of the white spot addresses due to a temperature according to the temperature difference and the temperature coefficient stored in said storage unit, obtains a correction value for the output level of the video signal at each of the white spot addresses due to a sensitivity according to a difference between the sensitivity at the time of shooting a subject and the sensitivity at the time of dark shooting stored in said storage unit and to the sensitivity coefficient stored in said storage unit, obtains a correction value for the output level of the video signal at each of the white spot addresses due to a time-in-second according to a difference between the time-in-second at the time of shooting a subject and the time-in-second at the time of dark shooting stored in said storage unit and to the time-in-second coefficient stored in said storage unit, performs correction on the output level of the video signal at each of the white spot addresses included in the video signal at the time of shooting a subject according to each correction value for the output level of the video signal at each of the white spot addresses due to the temperature, the sensitivity, and the time-in-second, and subtracts the optical black level median at the time of shooting a subject from the video signal at the time of shooting a subject.

2. The video signal correcting device of an electronic camera according to claim 1, wherein an optical black level average is used instead of said optical black level median.

3. A video signal correcting device of an electronic camera comprising:
   a storage unit which stores therein white spot addresses, and a reference dark current level median obtained from a video signal at a time of dark shooting, and a temperature, a sensitivity, and a time-in-second at the time of dark shooting, as well as a temperature coefficient for correcting the output level of the video signal at each of the white spot addresses and a dark current level median in accordance with a temperature at a time of shooting by the electronic camera, a sensitivity coefficient for correcting the output level of the video signal at each of the white spot addresses and the dark current level median in accordance with the sensitivity of the electronic camera, and a time-in-second coefficient for correcting the output level of the video signal at each of the white spot addresses and the dark current level median in accordance with an exposure time-in-second of the electronic camera;
   a temperature detection unit which detects the temperature at the time of shooting; and
   an operation unit which obtains a correction value for the output level of the video signal at each of the white spot addresses due to a temperature and a correction value for the dark current level median due to a temperature according to a difference between a temperature at a time of shooting a subject detected by said temperature detection unit and the temperature at the time of dark shooting stored in said storage unit and to the temperature coefficient stored in said storage unit, obtains a correction value for the output level of the video signal at each of the white spot addresses due to a sensitivity and a correction value for the dark current level median due to a sensitivity according to a difference between a sensitivity at the time of shooting a subject and the sensitivity at the time of dark shooting stored in said storage unit and to the sensitivity coefficient stored in said storage unit, obtains a correction value for the output level of the video signal at each of the white spot addresses due to time-in-second and a correction value for the dark current level median due to a time-in-second according to a difference between a time-in-second at the time of shooting a subject and the time-in-second at the time of dark shooting stored in said storage unit and to the time-in-second coefficient stored in said storage unit, and performs correction on the output level of the video signal at each of the white spot addresses and the dark current level median both included in the video signal at said time of shooting a subject according to each correction value for the output level of the video signal at each of the white spot addresses due to the temperature, the sensitivity, and the time-in-second.

4. The video signal correcting device of an electronic camera according to claim 3, wherein a dark current level average is used instead of said dark current level median.

5. The video signal correcting device of an electronic camera according to claim 3, wherein an optical black level median is used instead of said dark current level median.

6. The video signal correcting device of an electronic camera according to claim 3, wherein an optical black level average is used instead of said dark current level median.

* * * * *